Aug. 19, 1969   C. V. DI CAMILLO   3,461,899
CURVE FITTING WITH PURE FLUID AMPLIFIERS
Filed Oct. 6, 1966   3 Sheets-Sheet 1
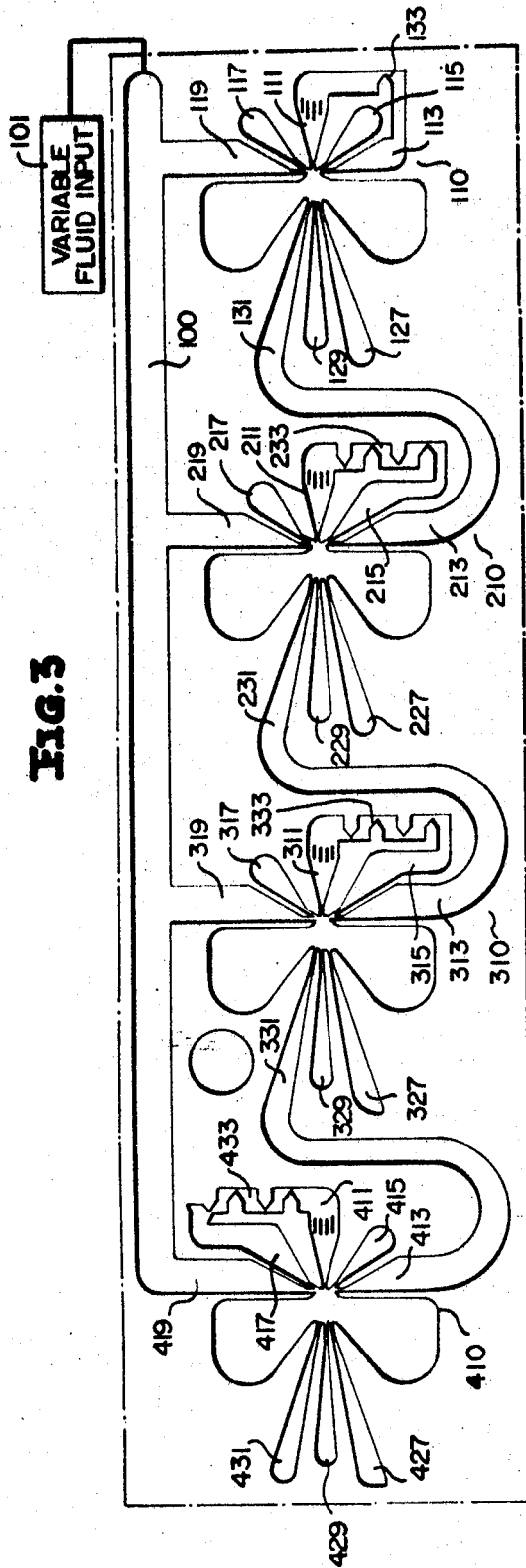
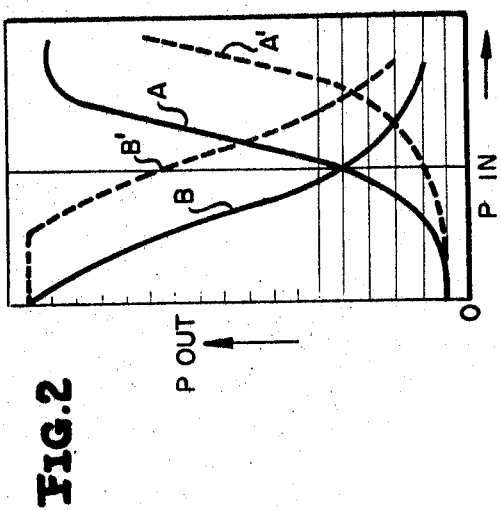
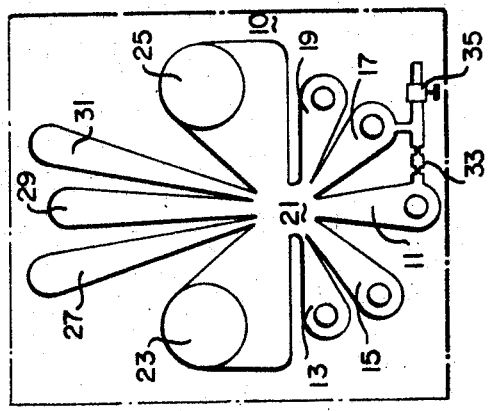
INVENTOR
CARMINE V. DI CAMILLO
BY
ATTORNEYS Aug. 19, 1969 C. V. DI CAMILLO 3,461,899
CURVE FITTING WITH PURE FLUID AMPLIFIERS
Filed Oct. 6, 1966 3 Sheets-Sheet 2

INVENTOR
CARMINE V. DI CAMILLO

BY *Hurvitz, Rose & Greene*

ATTORNEYS

INVENTOR
CARMINE V. DI CAMILLO

ATTORNEYS 3,461,899
CURVE FITTING WITH PURE
FLUID AMPLIFIERS
Carmine V. Di Camillo, Silver Spring, Md., assignor to
Bowles Engineering Corporation, Silver Spring, Md., a
corporation of Maryland
Filed Oct. 6, 1966, Ser. No. 584,814
Int. Cl. F15c 1/10
U.S. Cl. 137—81.5                                    15 Claims

ABSTRACT OF THE DISCLOSURE

A fluid function generator is capable of approximating virtually any output signal versus input signal function by utilizing a first fluidic amplifier fed by the input signal and by an output signal from a second fluidic amplifier which is also fed by the input signal. The second amplifier thus provides a variable bias signal to the first, the bias changing in response to the input signal in accordance with the gain characteristic of the second amplifier. Tailoring the gain characteristic of the second amplifier, as by fixed bias signals, determines the effectiveness of the variable bias signal at the first amplifier over specified input signal ranges.

---

This invention relates to pure fluid systems in general and, more specifically, to curve-fitting techniques employing pure fluid amplifiers in a cascaded network.

In pure fluid systems, it is often a requirement that an output signal be some specified non-linear function of a variable input signal. The non-linear function may be some ideal mathematical curve or some arbitrary curve resulting from certain practical considerations, but in either case, a fluid device capable of responding to an input signal in accordance with said function is useful in pure fluid computers, control devices, etc.

It is therefore an object of this invention to provide a device comprising a plurality of interconnected pure fluid amplifiers which produce a predetermined non-linear output signal in response to a variable input signal.

It is another object of this invention to provide a technique for utilizing a plurality of pure fluid amplifiers to achieve substantially any desired non-linear output versus input characteristic in a pure fluid device.

It is still another object of this invention to provide a method of matching the output versus input characteristic of a pure fluid device to any predetermined non-linear curve.

It is yet another object of this invention to provide a method of interconnecting a plurality of pure fluid amplifiers so as to produce a pure fluid device having a predetermined non-linear output versus input characteristic.

Still another object of this invention is to provide a pure fluid device having a predetermined non-linear output versus input characteristic by superimposing on one another the output versus input characteristics of a plurality of pure fluid amplifiers.

The above and still further objects, features and advantages of the present invention will become apparent upon consideration of the following detailed description of several specific embodiments thereof, especially when taken in conjunction with the accompanying drawings, wherein:

FIGURE 1 is a plan view of a pure fluid amplifier which is utilized in some of the embodiments of this invention;

FIGURE 2 is a plot of the output versus input characteristic of the amplifier of FIGURE 1;

FIGURES 3 and 4 are plan views of two various embodiments of this invention;

Figure 3A:
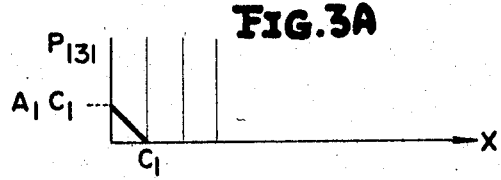
FIGURES 3A, 3B, 3C, 3D, 4A, 4B, 4C and 4D are plots of output versus input characteristics of the various amplifier stages in the embodiments of FIGURES 3 and 4.

In order to facilitate an understanding of the particular embodiments illustrated and to be described herein, it is first necessary to understand the operation of the pure fluid amplifier elements employed in these embodiments. The following description is of only one such element and two of the subsequently described embodiments employ only that element. This, however, it is not to be construed as limiting the scope of this invention to the use of only said element, for it will be readily apparent that various different types of fluid amplifiers may be used in various combinations to achieve particular output versus input characteristics. With this in mind, reference is made to FIGURE 1 wherein a particular pure fluid amplifier 10 of the stream interaction type and designed to operate in the analog mode is illustrated. In this type of amplifier, a power nozzle issues a stream of fluid into an interaction region or chamber. A control nozzle issues a control stream of fluid which impacts against and deflects the power stream away from the control nozzle. There is a conservation of momentums between the two streams and, therefore, the power stream is deflected at the point of impact from its original direction of flow through an angle which is a function of the momentum of the power stream and the momentum of the control stream. In this manner, a low energy control stream of fluid may be utilized to direct a high energy power stream of fluid toward or away from a target area or receiving aperture system, this constituting amplification.

Amplifier 10 comprises a power nozzle 11 and two left control nozzles 13 and 15, and two right control nozzles 17 and 19, all communicating with an interaction chamber 21. The interaction chamber extends laterally into left and right vented recesses 23 and 25, respectively, to minimize boundary layer effects and insure analog operation of amplifier 10.

Central output passage 29 opens into interaction chamber 21 co-axially with respect to power nozzle 11. Left and right output passages 27 and 31, respectively, open into interaction chamber 21 along axes which are respectively radially displaced to the left and right of the axis of power nozzle 11. Connected between power nozzle 11 and control nozzle 17 is restrictor 33 which also communicates with valve 35 at the end of the restrictor remote from power nozzle 11. It should be apparent from the subsequent description that restrictor 33 need not be employed for particular embodiments of this invention, and in the alternative, additional restrictors of various pressure-dropping capability may be employed between the power nozzle 11 and any one or more of the control nozzles 13, 15, 17 and 19.

In describing one possible mode of operation of amplifier 10, it will be assumed that a first source of fluid under constant pressure (not illustrated) is coupled to power nozzle 11. In addition to creating a power stream in chamber 21, this source results in a bias flow, of lower pressure than the power stream, being applied to control nozzle 17 via pressure-dropping restrictor 33, the amount of flow to nozzle 17 being adjustable via valve 35. An adjustable external bias signal may be coupled to nozzle 17 if desired, thereby eliminating the necessity for restrictor 33 and valve 35. It is assumed, for purposes of the following discussion, that control nozzles 15 and 19 and output passage 29 are vented to a suitable fluid dump, that a variable-pressure input signal (not illustrated) is supplied to control nozzle 13, and that suitable loads or utilization devices (not illustrated) are connected to output passages 27 and 31.

It may be noted that the power stream of fluid from power nozzle 11, when it arrives at the ingress orifices of the output passages 27, 29 and 31, has a transverse pressure gradient. The center of the stream is at a maximum pressure, while the boundary regions of the stream, due to momentum interchange with the ambient fluid, are at a lesser pressure. The width of the orifices of passages 27, 29 and 31 are here shown of such a size that each samples a small transverse portion of the power stream. If the power stream is axially centered on the orifice of passage 27, maximum pressure is developed at that passage. If the power stream is not directed at the center of the orifice of passage 27, then a lesser pressure is developed thereat. If the power stream is not impinging on the orifice of passage 27, then no significant pressure is developed at that passage. The fluid from the power and the control streams which does not pass into the passages 27, 29 or 31 is diverted to the regions 23 and 25 and is dumped through the fluid apertures therein which communicate with the atmosphere.

As previously stated, the hypothesized input signal for the apparatus illustrated in FIGURE 1 is applied to the control nozzle 13 and the output signal is taken from the right output passage 31. Thus, there is a positive relation between the input and the output signals; that is, the greater the input signal or pressure from the nozzle 13, the greater the deflection of the power stream towards the passage 31, and the greater the signal or pressure developed at a utilization device connected to passage 31.

Referring now specifically to FIGURE 2, under the conditions assumed above, curve a represents the output signal pressure at output passage 31 as a function of input signal pressure to control nozzle 13. Curve B represents the output signal pressure at output passage 27 as a function of input signal pressure to control nozzle 13. It is seen that curves A and B are non-linear at their extremities (minimum and maximum input pressures). This is due to the fact that the velocity profile of the power stream at the distances of the output passages from the power nozzle employed herein is a bell-shaped curve, symmetrical about the longitudinal axis of the stream. The reason for this may best be understood by considering the velocity profile (velocity as a function of distance transversely of the power stream axis) of the power stream. Upon reaching the ingress orifices of the output passages, the fluid at the boundaries of the power stream is flowing at a velocity which is slightly greater than that of the ambient fluid. The fluid at the center of the stream is flowing at a somewhat greater velocity, representing the maximum velocity of the stream. The slope of the curve between maximum and minimum velocities is not a straight line but rather more like a bell-shaped curve which rises gradually at first, thereafter rising rapidly through a center region of the stream over which region the curve levels off. The curve is symmetrical about the longitudinal axis of the power stream. Since, as mentioned above, the relatively narrow output passage orifices sample various portions of the power stream as the stream is deflected, these orifices are exposed to stream velocities which vary in accordance with stream deflection. Since each output passage receives fluid from a different region of the stream as the input signal varies, and since these regions have velocities which are defined by the bell-shaped velocity profile of the stream, the output signal pressure must follow the velocity profile curve of the stream as a function of input pressure. Thus, the curve A of FIGURE 2 is a plot of one-half of the velocity profile of the stream while curve B is a plot of the other half of the stream.

The shapes of curves A and B may be altered by varying the bias pressure levels at control nozzles 15, 17 and 19. For example, if the pressure at nozzles 17 or 19 is increased, a greater input pressure at nozzle 13 is required to deflect the power stream toward output passage 27 from its initial direction. As a result, the initial portions of the output curves tend to flatten somewhat as represented by dotted curves A' and B'. Decreasing the pressure at nozzle 15, as by suction or similar means, brings the same curve-flattening result. On the other hand, by making the pressure at nozzle 15 larger than the combined pressure at nozzles 17 and 19, the quiescent conditions can be reversed, with the power stream becoming normally directed toward output path 31. Obviously, the output signals can be made quiescently equal by equalizing or eliminating the bias signals, or by appropriate design of the amplifier configuration.

Another method of changing th shape of curves A and B involves feeding back one of the output signals, for example, the signal at output passage 31, to one of the control nozzles, for example, 15, in a manner described in co-pending application by D. R. Jones, Ser. No. 413,267, filed Nov. 23, 1964. Said application discusses a number of techniques for linearizing the gain characteristic of amplifiers such as 10, all of which are applicable to effect various shaped characteristics for purposes of this application.

Another manner in which the characteristic of the amplifier may be re-shaped is by applying to the control nozzles bias pressure signals which themselves vary as functions of the input signal. Such input-responsive bias signals may be generated by other fluid amplifiers having output versus input characteristics shaped in accordance with the principles discussed above. Thus, a cascaded group of such amplifiers can be employed to produce output versus input curves of substantially any shape. Three embodiments employing this principle are described below.

FIGURE 3 illustrates a device whereby a group of pure fluid amplifiers, such as amplifier 10 of FIGURE 1, are interconnected so as to produce an output pressure signal which varies approximately as the square root of the input pressure signal. The device comprises four cascaded fluid amplifier stages 110, 210, 310 and 410 with the individual elements of each amplifier being designated by the same reference numerals employed for like elements in FIGURE 1 but preceded by the numbers 1, 2, 3 or 4 to indicate to which amplifier stage the elements belong. All four stages have their power nozzles 111, 211, 311 and 411, respectively, connected to a constant pressure fluid power source (not illustrated). It is to be noted that system requirements may demand that different pressures be applied to the various power nozzles; thus, the nozzles may each be connected to individual constant pressure sources or preferably to a common constant pressure source via individual pressure dropping flow restrictors similar to restrictor 33 in FIGURE 1.

Control nozzles 119, 219, 319 and 419 are connected to a common duct 100 which conveys a fluid input signal of varying pressure to said nozzles from some input signal source 101. Control nozzles 115, 117, 217, 317 and 415 are vented to a suitable fluid dump, while control nozzles 113, 215, 315 and 417 are connected via respective pressure dropping flow restrictors 133, 233, 333 and 433 to the constant pressure power source (not illustrated) associated with each of the respective stages. Output passages 127, 129, 227, 229, 327, 329, 429 and 431 are vented to a suitable fluid dump. Output passage 131 of first stage 110 is connected to control nozzle 213 of second stage 210. Similarly, output passages 231 and 331 are connected to control nozzles 313 and 413, respectively. Output passage 427 of the final stage 410 is the output of the overall device and is connected to a suitable load or utilization device (not illustrated).

The operation of the embodiment illustrated in FIGURE 3 of the accompanying drawings is most readily understood when considered in conjunction with the input-output curves for stages 110, 210, 310 and 410, as illustrated in FIGURES 3A, 3B, 3C and 3D, respectively. Referring first to stage 110, FIGURE 3A represents a plot of the pressure output signal $P_{131}$ appearing at output passage 131 as a function of a variable pressure input signal X applied at control passage 119 and originating at source 101. This plot may be represented by the following mathematical expression:

$$P_{131} = A_1(C_1 - X) \tag{1}$$

where $A_1$ is the gain of amplifier stage 110, $C_1$ is the constant pressure signal appearing at control nozzle 113, responsive to flow restrictor 133, and X is the variable pressure input signal appearing at control nozzle 119. In the following description, the assumption is made that gain $A_1$ (as well as gains $A_2$, $A_3$ and $A_4$ of stages 210, 310, and 410, respectively) is constant over the range of input pressures being considered, which means that the gain characteristic for each amplifier is considered as being linear as opposed to the actual non-linear characteristic illustrated as curve B in FIGURE 2. The practical effects of this assumption are discussed in detail following the ensuing description of the operation of the device of FIGURE 3.

Under quiescent conditions (X=0), the only control signal acting on the power stream of stage 110 is constant pressure bias signal $C_1$ at control nozzle 113. The level of $C_1$ is such (as adjusted by throttle 35 of FIGURE 1) that when no other control signal is present, the power stream is directed along the centerline of passage 131, so as to produce a maximum pressure signal thereat. This quiescent output signal has a value $A_1C_1$ as found by setting X equal to 0 in Equation 1. As X assumes pressure levels greater than zero, the signal at control passage 119 opposes the constant pressure at nozzle 113 and deflects the power stream away from output passage 131 and towards passages 129 and 127. As illustrated by FIGURE 3A and by the $A_1X$ factor of Equation 1, this increase in X is manifested by a pressure decrease from the $A_1C_1$ maximum level at output passage 131, such decrease being proportional to the magnitude of the increase in X. As X increases further, the power stream is deflected further towards passages 127 and 129 and $P_{131}$ continues to decrease in proportion to the increase in X. When X becomes equal to $C_1$, $P_{131}$ becomes substantially equal to zero because the power stream receives equal but opposite pressures from control nozzles 113 and 119 so that substantially the entire power stream is directed to vented output passage 129. For values of X above $C_1$, the power stream is directed still further away from output passage 131 and signal $P_{131}$ therefore remains zero.

Figure 3B:
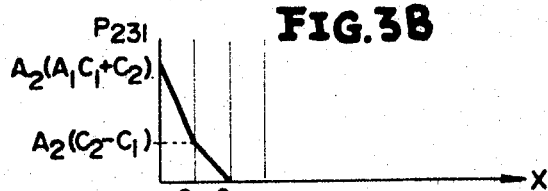

Referring now to amplifier stage 210 and the output versus input characteristic in FIGURE 3B for the output signal $P_{231}$ at passage 231, the following mathematical relationship may be derived for $P_{231}$ for $0 \leq X \leq C_1$:

$$P_{231} = A_2[A_1(C_1 - X) + C_2 - X] \tag{2}$$

where $A_1$, $C_1$ and X are as defined above, $A_2$ is the linearly approximated gain of stage 210, and $C_2$ is the value of the constant pressure signal created at control nozzle 215 by flow restrictor 233. The component parts of the righthand side of Equation 2 represent the signals appearing at the various control nozzles of stage 210. For example, the $A_1(C_1 - X)$ term is actually $P_{131}$ as defined in Equation 1 and is provided at control nozzle 213 from output passage 131 of stage 110; the $C_2$ term is the constant pressure signal at control nozzle 215, as defined; and X is the variable input signal appearing at control nozzle 219. When X is at zero pressure, $P_{231}$ becomes equal to $A_2(A_1C_1 + C_2)$, a constant pressure level resulting from the power stream deflection caused by two aiding pressure signals; namely, $A_1C_1$ at nozzle 213 and $C_2$ at nozzle 215. $C_2$ is adjusted so that for quiescent conditions (X=0) the power stream of stage 210 is directed along the centerline of output passage 231. This produces maximum output pressure under quiescent conditions. As X increases, the $P_{131}$ signal appearing at control nozzle 213 decreases as illustrated in FIGURE 3A and signal $C_2$ at nozzle 215 remains the same, resulting in a net control pressure decrease on one side of the power stream. Similarly, the increasing X signal causes increasing pressure on the opposite side of the power stream. These effects on opposite sides of the power stream are additive to cause the power stream to be deflected away from passage 231 at a faster rate with respect to increases in X than would be the case if only the X signal, or if only the $A_1X$ signal were applied to their respective control nozzles. Thus, the slope of the curve in FIGURE 3B is comparatively large (more negative) relative to the slope of the curve 3A for values of X between zero and $C_1$. This comparatively large slope may be represented mathematically as $-A_2(A_1 + 1)$, obtained by multiplying Equation 2 through for the coefficient of X. As described above, when X becomes equal to $C_1$, $P_{131}$ is substantially zero and thus there is no signal at control nozzle 213. By substituting $C_1$ for X in Equation 2, it is discovered that when $X = C_1$, $P_{231}$ is equal to $A_2(C_2 - C_1)$. As X increases above $C_1$, $P_{231}$ decreases from this $A_2(C_2 - C_1)$ value at a rate somewhat less than the rate of decrease experienced for increasing values of X in the range $0 \leq X \leq C_1$. This is true since the increasing power stream deflection effect of signal X at control nozzle 219 is no longer aided by a decreasing deflection effect at nozzle 213 when X is greater than $C_1$. In fact, the slope is determined entirely by $A_2$ in this region as opposed to the $-A_2(A_1 + 1)$ slope for values of X less than $C_1$. This is best illustrated by considering the following mathematical expression defining $P_{231}$ for the region $C_1 \leq X \leq C_2$:

$$P_{231} = A_2(C_2 - C_1) - A_2(X - C_1) \tag{3}$$

It is apparent from Equation 3 that the slope in this region (the coefficient of X) is equal to $-A_2$, and it is also apparent that for $X = C_2$ the value of $P_{231}$ becomes zero. This latter fact is to be expected since when the pressure at control nozzle 219 (X) is equal to the pressure at control nozzle 213 ($C_2$), and the pressures at nozzles 215 and 217 are zero, substantially the entire power stream is directed toward vented output passage 229, thereby rendering the pressure level at output passage 231 substantially zero.

Figure 3C:
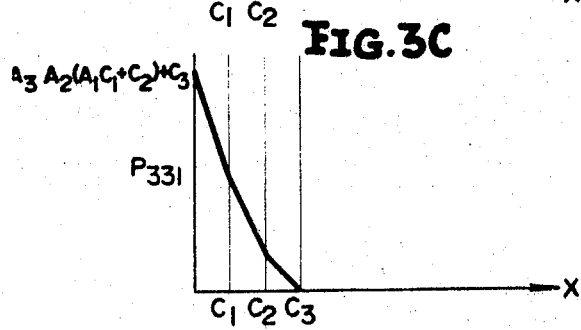

Amplifier stage 110 cuts off at values of X above $C_1$, such that it no longer affects stage 210. This causes a change in the rate of decrease of output pressure at passage 231 of stage 210. In a similar manner, it can be demonstrated that the gain characteristic of amplifier stage 310 exhibits three different slopes in three respective regions of values for the same region of $\Delta X$. Specifically, it is noted that stage 310 receives three input signals; namely, $P_{231}$ at control nozzle 313, a constant pressure signal defined as $C_3$ at nozzle 315, and X at nozzle 319. When X=0, the only signals having any effect on deflecting the power stream of stage 310 are $P_{231}$ which has a value $A_2(A_1C_1 + C_2)$ as described above and $C_3$, which may be adjusted such that the combined effect of both signals deflects the power stream so as to be directed along the centerline of passage 331. This produces a maximum quiescent pressure level, at passage 331, of $A_3A_2(A_1C_1 + C_2) + A_3C_3$, where $A_3$ is the approximated constant gain of amplifier stage 310. As illustrated in FIGURE 3C, which is the gain characteristic for stage 310 with respect to the output signal at passage 331, increasing values of X produce a relatively steep rate of pressure decrease at passage 331 from the aforementioned quiescent level. This relatively steep decrease rate occurs because of the aiding effects of an increasing pressure in signal X at nozzle 319 and a decreasing pressure in signal $P_{231}$ at nozzle 313. For values of X below $C_1$, $P_{231}$ is controlled by the larger of its two characteristic slopes, this resulting from the above-described effect which signal $P_{131}$ from stage 110 has on signal $P_{231}$. When X is greater than $C_1$, stage 110 has been shown to be cut-off and $P_{231}$ has been shown to reflect this cut-off condition by exhibiting a smaller slope. Thus, the decreasing $P_{231}$ signal at nozzle 331 still aids the increasing X signal at nozzle 319 for values of X greater than $C_1$, but the aiding effect is not as pronounced for a given change in X as was the case for values of X less than $C_1$, and the gain characteristic for $P_{331}$ in FIGURE 3C exhibits a lesser slope in the region of X values above $C_1$ than in the region of X values below $C_1$. As was previously noted, stage 210 cuts off at values of X above $C_2$ which causes the $P_{231}$ signal applied to nozzle 313 to assume a zero value. Thus, for values of X above $C_2$, there is no variable control signal applied to stage 310 except signal X at nozzle 319. With X acting alone, unaided by a decreasing $P_{231}$ signal, the rate at which the power stream is deflected with respect to changes in X is substantially less than for lower values of X. Thus, as illustrated in FIGURE 3C, $P_{331}$ drops off at a still lesser rate as X increases in the range of X values above $C_2$ than was the case for values of X between $C_1$ and $C_2$. This still lesser rate continues for increasing values of X until X equals $C_3$ at which time the control pressure from nozzle 319 balances that from 315 and substantially the entire power stream is directed towards vented passage 329, thereby producing essentially zero output pressure at passage 331.

Figure 3D:
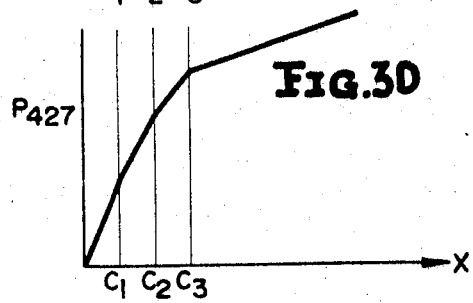

In a manner similar to that described above in which the gain characteristic for stage 310 was illustrated as exhibiting three distinct slopes in three different regions of X values, it can be demonstrated that stage 410 has a gain characteristic exhibiting four such different slopes, as illustrated in FIG. 3D. Specifically, the control signals applied to stage 410 comprise $P_{331}$ at nozzle 413, $C_4$ at nozzle 417, and X at nozzle 419. When $X=0$, only signals $P_{331}$ and $C_4$ act to deflect the power stream of stage 410, and these signals produce pressures which are opposite insofar as their effect on the power stream is concerned. Since we are attempting to provide an output signal $P_{427}$ at passage 427 which represents the square root of X, it is desirable that $P_{427}$ be equal to zero when X is zero. Thus, the quiescent value (for $X=0$) of the signal $P_{331}$ must be greater than $C_4$ and such that the power stream is deflected away from passage 427. This may be accomplished by adjusting restrictor 433 accordingly as described in relation to element 35 of FIGURE 1. In fact, since the square root curve rises sharply for low values of X, the relative pressures of the quiescent $P_{331}$ and $C_3$ have a net effect of directing the power stream somewhat towards vented passage 429 but such that the slightest pressure increase in signal X at nozzle 419 produces a discernible pressure at passage 427. Thus, as X increases in the range $0 \leq X \leq C_1$, there is a sharply sloped pressure signal response at passage 427 corresponding to the aiding effect of increasing pressure (signal X) at control nozzle 419 and decreasing pressure (signal $P_{331}$ operating in the region in which it exhibits the greatest slope) at nozzle 413. For values of X greater than $C_1$ but less than $C_2$, the effects of stage 110 are no longer present, thus signal $P_{331}$ decreases at a lesser rate for increasing X and the output signal $P_{427}$ continues to increase but at a somewhat lower rate. For $C_2 \leq X \leq C_3$, amplifier stage 210 no longer has any effect on signal $P_{331}$, and $P_{427}$ exhibits a still lesser slope. For values of X above $C_3$, $P_{331}$ is zero and the only effective variable signal is X itself. Thus, increases in X above $C_3$ still produce changes in $P_{427}$ but at a still further reduced slope.

The curve of FIGURE 3D approximates the square root curve in that output signal $P_{427}$ rises sharply for increases in X at low levels of X, and continues to rise but at a decreasing rate for higher values of X. In fact, the curve of FIGURE 3D resembles a piecewise linear approximation of the square root curve. In describing the operation of the circuit of FIGURE 3, it was assumed that the various amplifier characteristics were entirely linear, thereby ignoring the nonlinear portions of curve B in FIGURE 2, in order to facilitate an understanding of the operation of the circuit. These non-linear portions tend to smooth out the piecewise aspects of the curves in FIGURES 3A through 3D so as to produce a curved transition between each segment of the curve and provide an even closer approximation of the square root function, for the following reasons: Since the values of $C_1$, $C_2$ and $C_3$ are chosen such that the quiescent values of output signals $P_{131}$, $P_{231}$ and $P_{331}$, respectively, lie at the peak portion of characteristic curve B in FIGURE 2, the respective output signals exhibit non-linear gain characteristics at their extremities as exhibited by curve B at its extremities. Specifically, in FIGURE 3A, $P_{131}$ becomes somewhat asymptotic as it approaches zero in the same manner as curve B smoothes, and thus the sharp transition at $C_1$ in FIGURE 3A is in reality a smooth transition under actual conditions. Similarly, the sharp transitions occurring at points $C_1$, $C_2$, $C_3$ and $C_4$ in FIGURES 3B, 3C and 3D are in reality smoothed by the upper and lower nonlinear portions of curve B so that the output versus input characteristic for $P_{427}$ really is a smooth curve rather than the piecewise linear approximation of FIGURE 3D.

The above description is not intended to limit quiescent conditions in all possible embodiments which may employ the inventive concepts disclosed herein. For example, the power streams for stages 110, 210 and 310 do not necessarily have to be quiescently directed along the centerline of respective output passage 131, 231 and 331, but rather may be somewhat displaced from the centerline such that the quiescent output signals are not representative of the maximum amplifier output level. This scheme does not utilize each stage to its full amplification capability, but nevertheless, has utility in particular applications.

A particular application of the square root circuit might be subject to system limitations with respect to permissible output signal levels, etc. The signals in the embodiment of FIGURE 3 may be scaled accordingly by changing the power stream pressure in one or more stages, an expedient which reduces the output signal level but which does not affect the shape of the output versus input characteristic. As discussed previously, the power stream pressure may be made different in each stage by means of a series of adjustable restrictors or by utilizing separate fluid pressure sources.

In the above-described embodiment, it is preferable to include an adjustment means such as valve 35 of FIGURE 1 in conjunction with restrictors 133, 233, 333 and 433 so as to provide a trim control for better approximation of the square root curve.

Figure 4A:
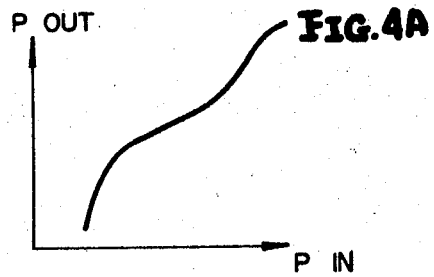
Figure 4B:
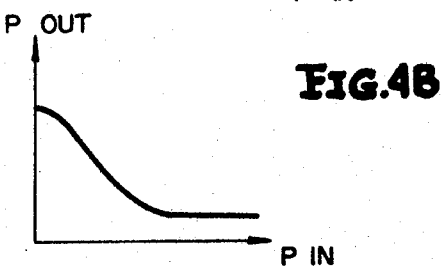
Figure 4C:
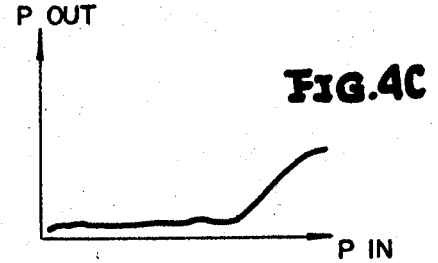
Figure 4D:
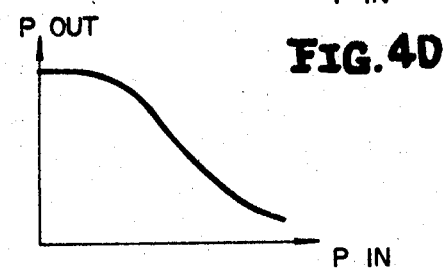
Figure 4:
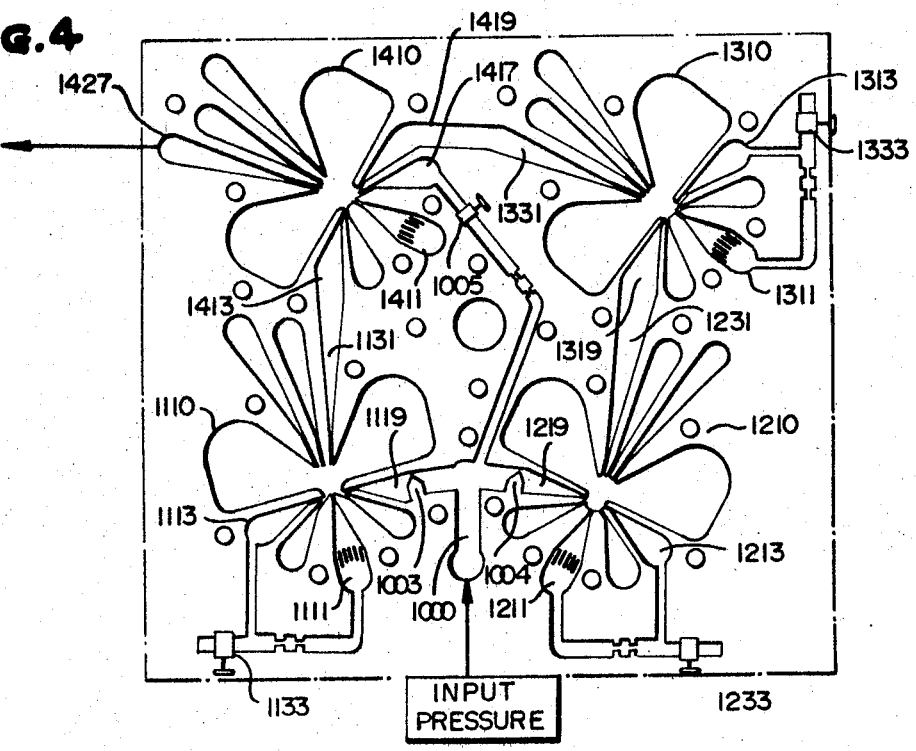

The embodiment of FIGURE 4 demonstrates a more general application of the principles of this invention. This embodiment has an output versus input characteristic approximating an arbitrary curve such as that of FIGURE 4A which may be any theoretically or experimentally obtained curve. In FIGURE 4, four fluid amplifiers 1110, 1210, 1310 and 1410 are illustrated, the individual elements of each being designated by reference numerals corresponding to those for respective elements in FIGURE 1 but having the numerals 11, 12, 13 or 14, respectively prefixed therebefore to indicate the amplifier to which the element belongs.

The various power nozzles 1111, 1211, 1311 and 1411 of each amplifier stage are connected to respective constant pressure fluid power sources (not illustrated). Control nozzles 1113, 1213 and 1313 are also connected to these respective power sources via pressure dropping restrictors 1133, 1233 and 1333, respectively. A source of variable input pressure 1001 is connected to a common duct 1000 which in turn connects with control nozzles 1119, 1219, and 1417 via respective restrictors 1003, 1004 and 1005. Control nozzle 1319 is connected to output passage 1231, control nozzle 1419 is connected to output passage 1331, and control nozzle 1413 is connected to output passage 1131. Output passage 1427 comprises the output for the overall device and is connected to a suitable load or utilization device (not illustrated). The remaining control nozzles and output passages are vented to suitable fluid dumps.

In considering the operation of the device of FIGURE 4, it will be assumed that the bias signal applied to control nozzle 1213 via restrictor 1233 is at a relatively high pressure, that the bias applied to control nozzle 1113 via restrictor 1133 is at a relatively low pressure, and that the bias applied to control 1313 via restrictor 1333 is at some moderately nominal pressure intermediate that the other two bias signals. Under these conditions, the input signal at control nozzle 1219 must become relatively large before it has any effect on the output of stage 1210 and therefore the gain curve for output passage 1231 as illustrated in FIGURE 4D has a relatively flat portion for low values of input signal, and gradually assumes the normal amplifier characteristic curve as the input becomes larger. Similarly, a high input signal at control nozzle 1319 will overcome the moderate bias at nozzle 1313 to substantially deflect the power stream and minimize the output signal at passage 1331 of stage 1310. Since the input signal to nozzle 1319 is really the output signal from passage 1231, this input is quite high for low values of signal from input source 1001, as indicated by the curve of FIGURE 4D. Thus, the power stream is deflected away from passage 1331 until the signal from source 1001 increases to the level at which the output of passage 1219 (FIGURE 4D) becomes low enough to permit the bias signal at nozzle 1313 to begin to deflect the power stream in amplifier 1310. As illustrated in FIGURE 4C, this results in an output characteristic curve for passage 1331 which is minimal and flat for most of the lower and middle region input pressures, and which begins to assume the normal amplifier characteristic curve at some relatively high input pressure.

Since the bias at control nozzle 1113 of amplifier 1110 is relatively low, relatively low input signal pressures at control nozzle 1119 will effect a change in the power stream direction. As a result, the gain characteristic for output passage 1131 of amplifier 1110 has substantially no flat portion for small values of input signal and decreases rather rapidly until it levels off at some minimal value as illustrated in FIGURE 4B.

The output stage 1410 of the device of FIGURE 4 is controlled by three signals which vary as a function of the input signal at source 1001. The signals are: the input signal at some reduced level which is applied to nozzle 1417 via restrictor 1005; the signal from output passage 1131 which is applied to nozzle 1413 and which responds to the input signal from 1001 in a manner defined by the curve of FIGURE 4B; and the signal from output passage 1331 which is applied to nozzle 1419 and responds to the input signal from source 1001 in a manner defined by the curve of FIGURE 4C. Thus, for a zero input signal level, the minimal output from amplifier 1310 at nozzle 1419 has substantially no effect on the power stream of amplifier 1410, the high output from amplifier 1110 at nozzle 1413 tends to deflect the stream away from output passage 1427, and the input signal itself at nozzle 1417 is, of course, zero and has no effect. Upon gradual increase of the input pressure from source 1001, the signal at nozzle 1419 (FIGURE 4C) remains minimal and has little effect, but the signal at nozzle 1417 increases while the output of amplifier 1110 at nozzle 1413 decreases so that both signals act to reduce the deflection of the power stream away from output passage 1427. As illustrated in FIGURE 4A, the output characteristic curve for passage 1427 has a rather steep slope for low level input signals, reflecting the aiding effect of the two signals just described. As the input signal is increased further, the output of amplifier 1110 begins to level off at some minimal value (FIGURE 4B) so that the signal at nozzle 1413 produces little effect on the power stream. Since the signal from amplifier 1310 remains minimal for these input levels, the only signal which has substantial effect on the power stream is the signal at nozzle 1417. Thus, as the input signal increases through this region, the normal characteristic of the amplifier 1410 dominates, resulting in a lesser slope for this portion of the characteristic curve (FIGURE 4A) than for the previous portion. If the input signal is increased still further, the output from amplifier 1110 remains minimal and relatively ineffective at nozzle 1413, but the output of amplifier 1310 at nozzle 1419 increases in a manner to aid the input signal at nozzle 1417 in deflecting the stream toward output passage 1427. The result is a steeper output slope for this section of the gain characteristic of amplifier 1410. The embodiment of FIGURE 4 has actually been constructed to match the experimentally obtained flow characteristics of a particular valve, said characteristics being represented in FIGURE 4A.

The technique employed above; namely, the superposition of portions of the characteristics of a plurality of interconnected pure fluid amplifiers, can similarly result in a device having substantially any desired output versus input characteristic. The use of adjustable restrictors enables one to trim the various stages to more closely approximate the desired overall curve. In addition, where the device requires a relatively large number of amplifiers to achieve a particular characteristic shape but does not require the overall gain inherent in the use of such a number of amplifiers, restrictors may be used to scale down the power stream pressure, the various control pressures, and the input pressure as necessary. Various other expedients, such as feedback, are also contemplated in obtaining desired results.

While the above-described embodiments utilize only one specific type of pure fluid amplifier, the invention described herein is not intended to be so limited. Any type of pure fluid amplifier, whether of the stream interaction type, the boundary layer effect type, the vortex type, etc. may be employed in various combinations to achieve specific gain characteristics. For example, the rather simple device schematically illustrated in FIGURE 5 makes use of a bistable fluid amplifier 500 having one of its output passages 501 connected to a control nozzle 513 of an analog amplifier 510. These amplifiers may be of any appropriate type so long as they are designed to operate bistably in the case of amplifier 500 and in an analog manner in the case of amplifier 510. Respective constant pressure fluid sources are applied to the power nozzles 502 and 512. A variable pressure input signal from some external source such as 520 is connected to control nozzles 503 and 513 of the respective amplifiers. Control nozzle 504 of amplifier 500 is connected to a suitable bias pressure. Output passage 506 of amplifier 500 is connected to control nozzle 514 of amplifier 510. Output passage 515 of amplifier 510 provides the output for the overall device and may be connected to a suitable load or utilization device (not illustrated).

Figure 5A:
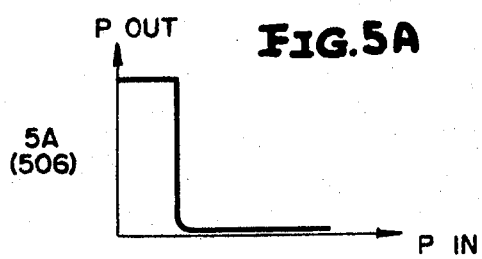
FIGURES 5A, 5B and 5C are plots of the output versus input characteristics of the amplifier stages in the embodiment of FIGURE 5.

The nature of bistable amplifier 500 is such that the power stream will normally be deflected to output passage 506 in the absence of any input signal at nozzle 503. As the level of the input signal is increased, the stream remains so deflected until the input reaches some predetermined threshold pressure, at which time the stream rapidly switches to output passage 505. The switching threshold is determined by various factors such as amplifier physical configuration, bias level at nozzle 504, and the like. The resulting output versus input characteristic of amplifier 500 therefore is step-shaped as illustrated in FIGURE 5A which is the characteristics for output 506.

Figure 5B:
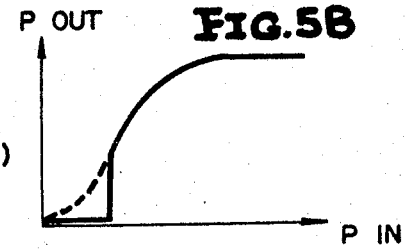
Figure 5C:
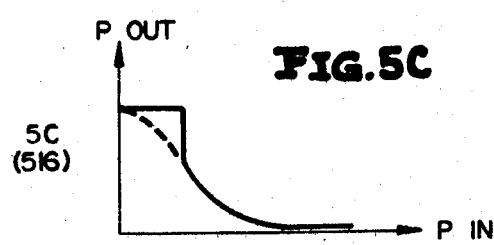
Figure 5:
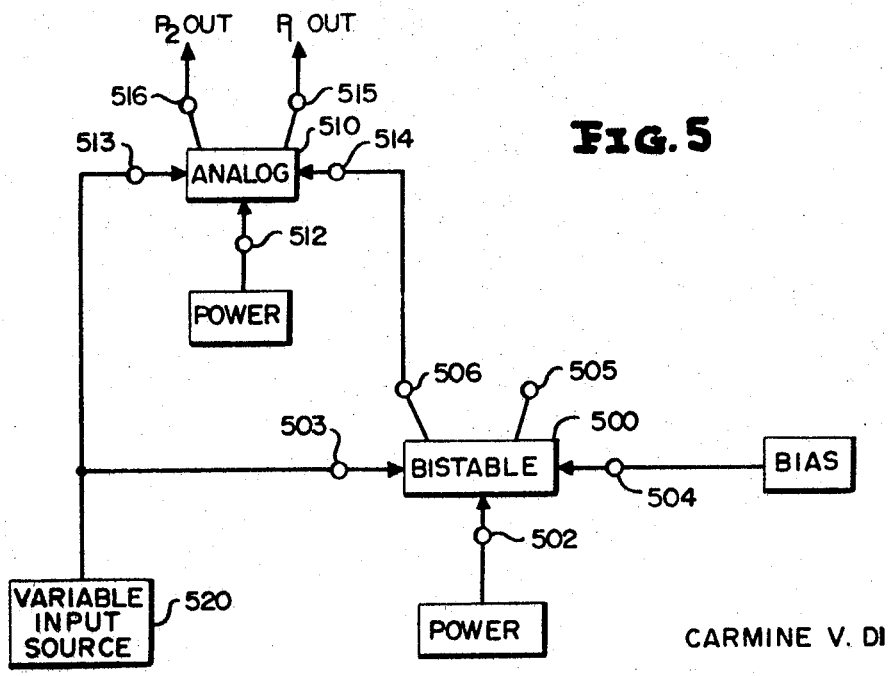
FIGURE 5 is a schematic representation of still another embodiment of this invention.

The gain characteristics for outputs 515 and 516 of amplifier 510 are illustrated in FIGURE 5B and 5C, respectively. The dotted portions of the curves represent the natural amplifier characteristics for an input at nozzle 513 without the influence of any signal at control nozzle 514. As is evident, these curves are somewhat similar to curves A and B in FIGURE 2. The effect on the characteristics of connecting the output at passage 506 from amplifier 500 to nozzle 514 is illustrated by the solid lines in FIGURES 5B and 5C. Since, for values of input signal below the predetermined threshold, there is a high level signal at nozzle 514, substantially all of the power stream of amplifier 510 is deflected towards passage 516. If this signal at nozzle 514 is made quite large relative to the expected range of input levels, the input signal produces no effect on the stream so long as the input signal from source 520 remains below the predetermined threshold. Once the input exceeds the threshold, however, amplifier 500 is switched such that output 506 is at substantially zero pressure, and amplifier 510 is then controlled solely by the input signal at nozzle 513. Thus, for signals above the threshold of amplifier 500, the output characteristic for amplifier 510 is the normal characteristic of said amplifier unaffected by bias signals.

It is readily seen from the embodiment just described that even gain characteristics having discontinuities or steps therein can be designed into a device comprising conventional fluid amplifiers. It should be pointed out that characteristics of more complex shape, including curves exhibiting hysteresis effects (plural values of output pressure for any particular input pressure) are possible by merely employing the appropriate amplifier components appropriately interconnected.

I claim:

1. A fluidic device for producing an output pressure signal which responds to a variable-pressure input signal as a predetermined non-linear function of said input signal, comprising:
   a first pure fluid amplifier comprising a power nozzle, a plurality of control nozzles, and a plurality of output passages, and having a pressure gain characteristic of which at least a first portion, as defined by a range of input pressures, is substantially different from a corresponding first portion of said predetermined non-linear function;
   means providing a source of fluid at constant pressure at said power nozzle;
   means for connecting said input signal to a first of said control nozzles;
   variable bias means responsive to said input signal for modifying said first portion of said gain characteristic to substantially conform to said corresponding first portion of said predetermined non-linear function;
   means for connecting said variable bias signal means to at least a second of said control nozzles;
   wherein said variable bias means comprises at least a second pure fluid amplifier.

2. The device of claim 1 further comprising fixed bias means connected to said second pure fluid amplifier for rendering it ineffective to modify a second portion of said gain characteristic.

3. The device of claim 2 further comprising additional fixed bias means connected to said first pure fluid amplifier for modifying a portion of said gain characteristic to conform to a corresponding portion of said non-linear function.

4. A fluidic device for producing an output pressure signal which responds to a variable-pressure input signal as a predetermined non-linear function of said input signal, comprising:
   a first pure fluid amplifier comprising a power nozzle, a plurality of control nozzles, and a plurality of output passages, and having a pressure gain characteristic of which at least a first portion, as defined by a range of input pressures, is substantially different from a corresponding first portion of said predetermined non-linear function;
   means providing a source of fluid at constant pressure at said power nozzle;
   means for connecting said input signal to a first of said control nozzles;
   variable bias means responsive to said input signal for modifying said first portion of said gain characteristic to substantially conform to said corresponding first portion of said predetermined non-linear function;
   means for connecting said variable bias signal means to at least a second of said control nozzles;
   wherein said gain characteristic has a plurality of portions, as defined by a respective plurality of input pressure ranges, which differ substantially from respective corresponding portions of said non-linear function, and further comprising:
   a plurality of variable bias means for modifying said plurality of portions of said gain characteristic to substantially conform to said respective corresponding portions of said non-linear function;
   means for connecting said plurality of variable bias means to at least one of said control nozzles.

5. The device of claim 4 wherein said plurality of variable bias means each comprise a pure fluid amplifier.

6. The device of claim 5 further comprising an adjustable fixed bias means connected to each of said pure fluid amplifiers for controlling the effect produced by each variable bias means on said gain characteristic.

7. A fluidic device for producing an output pressure signal which responds to a variable-pressure input signal as a predetermined non-linear function of said input signal, comprising:
   a first pure fluid amplifier comprising a power nozzle, a plurality of control nozzles, and a plurality of output passages, and having a pressure gain characteristic of which at least a first portion, as defined by a range of input pressures, is substantially different from a corresponding first portion of said predetermined non-linear function;
   means providing a source of fluid at constant pressure at said power nozzle;
   means for connecting said input signal to a first of said control nozzles;
   variable bias means responsive to said input signal for modifying said first portion of said gain characteristic to substantially conform to said corresponding first portion of said predetermined non-linear function;
   means for connecting said variable bias signal means to at least a second of said control nozzles;
   wherein said predetermined non-linear function is the square root function, and wherein said variable bias means comprise three cascaded analog pure fluid amplifiers responsive to said input signal to modify said gain characteristic to conform substantially to said square root function.

8. A fluidic device for producing an output pressure signal which responds ot a variable-pressure input signal as a predetermined non-linear function of said input signal, comprising:
   a first pure fluid amplifier comprising a power nozzle, a plurality of control nozzles, and a plurality of output passages, and having a pressure gain characteristic of which at least a first portion, as defined by a range of input pressures, is substantially different from a corresponding first portion of said predetermined non-linear function;
   means providing a source of fluid at constant pressure at said power nozzle;
   means for connecting said input signal to a first of said control nozzles;
   variable bias means responsive to said input signal for modifying said first portion of said gain characteristic to substantially conform to said corresponding first portion of said predetermined non-linear function;
   means for connecting said variable bias signal means to at least a second of said control nozzles;

wherein said predetermined non-linear function has three portions which approximate straight lines of different slopes and wherein said variable bias means comprises:

means comprising two cascaded analog pure fluid amplifiers connected to one of said control nozzles for modifying one portion of said gain characteristic to substantially conform to one of said three portions of said non-linear function; and means comprising another analog pure fluid amplifier connected to another of said control nozzles for modifying another portion of said gain characteristic to substantially conform to a second of said three portions of said non-linear function.

9. A fluidic device for producing an output pressure signal which responds to a variable-pressure input signal as a predetermined non-linear function of said input signal, comprising:

a first pure fluid amplifier comprising a power nozzle, a plurality of control nozzles, and a plurality of output passages, and having a pressure gain characteristic of which at least a first portion, as defined by a range of input pressures, is substantially different from a corresponding first portion of said predetermined non-linear function;

means providing a source of fluid at constant pressure at said power nozzle;

means for connecting said input signal to a first of said control nozzles;

variable means responsive to said input signal for modifying said first portion of said gain characteristic to substantially conform to said corresponding first portion of said predetermined non-linear function;

means for connecting said variable bias signal means to at least a second of said control nozzles;

wherein said predetermined non-linear function is discontinuous for at least one input pressure, and wherein said variable bias means comprises:

means including a bistable pure fluid amplifier connected to one of said control nozzles and responsive to said input signal for modifying said first portion of said gain characteristic and for producing a discontinuity therein which corresponds to the discontinuity in said predetermined non-linear function.

10. A fluidic circuit for providing an output pressure which is a predetermined function of a variable pressure input signal, said circuit comprising:

a first pure fluid amplifier responsive to application thereto of said variable pressure input signal for providing a further signal having a pressure which varies as a function of said variable pressure input signal;

a second pure fluid amplifier responsive to simultaneous application thereto of said variable pressure input signal and said further signal for providing said output pressure;

means for applying said variable pressure input signal to said first and second fluid amplifiers; and means for applying said further signal to said second pure fluid amplifier.

11. A fluidic circuit for providing a fluid output signal as a function of a fluid input signal, said circuit comprising:

first and second pure fluid amplifiers, each comprising: a power nozzle responsive to application of pressurized fluid thereto for issuing a power stream of fluid; a first control nozzle responsive to application of pressurized fluid thereto for issuing a control stream in interacting relationship with said power stream to deflect said power stream in accordance with the pressure of the fluid applied to said control nozzle; and at least one output passage disposed for receiving varying portions of said power stream as a function of power stream deflection;

a second control nozzle for said second pure fluid amplifier responsive to application of pressurized fluid thereto for issuing a control stream in interacting relationship with said power stream to deflect said power stream in accordance with the pressure of the fluid applied to said second control nozzle;

means for applying said fluid input signal to the first control nozzle of both said first and second pure fluid amplifiers;

and fluid passage means for interconnecting said output passage of said first pure fluid amplifier and said second control nozzle of said second pure fluid amplifier;

wherein said fluid output signal for said circuit appears at said output passage of said second pure fluid amplifier.

12. The circuit according to claim 11 further comprising:

a third control nozzle for said second pure fluid amplifier responsive to application of pressurized fluid thereto for issuing a control stream in interacting relationship with said power stream to deflect said power stream in accordance with the pressure of the fluid applied to said third control nozzle;

a third pure fluid amplifier comprising: a power nozzle responsive to application of pressurized fluid thereto for issuing a power stream of fluid; a first control nozzle responsive to application of pressurized fluid thereto for issuing a control stream in interacting relationship with said power stream to deflect said power stream in accordance with the pressure of the fluid applied to said first control nozzle; and at least one output passage disposed for receiving varying portions of said power stream as a function of power stream deflection;

means for applying said fluid input signal to said first control nozzle of said third pure fluid amplifier; and fluid passage means for interconnecting said output passage of said third pure fluid amplifier and said third control nozzle of said second pure fluid amplifier.

13. The circuit according to claim 11 further comprising:

a second control nozzle for said first pure fluid amplifier responsive to application of pressurized fluid thereto for issuing a control stream in interacting relationship with said power stream to deflect said power stream in accordance with the pressure of the fluid applied to said second control nozzle;

a third pure fluid amplifier comprising: a power nozzle responsive to application of pressurized fluid thereto for issuing a power stream of fluid; a first control nozzle responsive to application of pressurized fluid thereto for issuing a control stream in interacting relationship with said power stream to deflect said power stream in accordance with the pressure of fluid applied to said first control nozzle; and at least one output passage disposed for receiving varying portions of said power stream as a function of the power stream deflection;

means for applying said fluid input signal to said first control nozzle of said third pure fluid amplifier; and fluid passage means for interconnecting said output passage of said third pure fluid amplifier and said second control nozzle of said first pure fluid amplifier.

14. The circuit according to claim 11 further comprising:

a second control nozzle for said first pure fluid amplifier responsive to application of pressurized fluid thereto for issuing a control stream in interacting relationship with said power stream to deflect said power stream in accordance with the pressure of the fluid applied to said second control nozzle; and means for applying a bias pressure to said second control nozzle of said first pure fluid amplifier.

15. The circuit according to claim 14 wherein at least one of said pure fluid amplifiers is bistable.

References Cited

UNITED STATES PATENTS

| | | | |
|---|---|---|---|
| 3,155,825 | 11/1964 | Boothe | 137—81.5 XR |
| 3,193,197 | 7/1965 | Bauer | 137—81.5 XR |
| 3,250,469 | 5/1966 | Colston | 137—81.5 XR |
| 3,292,648 | 12/1966 | Colston | 137—81.5 XR |
| 3,338,515 | 8/1967 | Dexter | 137—81.5 XR |
| 3,339,571 | 9/1967 | Hatch | 137—81.5 |
| 3,340,885 | 9/1967 | Bauer | 137—81.5 |

SAMUEL SCOTT, Primary Examiner